United States Patent [19]

McCoy

[11] Patent Number: 4,802,120

[45] Date of Patent: Jan. 31, 1989

[54] MULTISTAGE TIMING CIRCUIT FOR SYSTEM BUS CONTROL

[75] Inventor: Edward McCoy, Fort Worth, Tex.

[73] Assignee: Tandy Corporation, Fort Worth, Tex.

[21] Appl. No.: 96,672

[22] Filed: Sep. 14, 1987

Related U.S. Application Data

[63] Continuation of Ser. No. 666,506, Oct. 30, 1984, abandoned.

[51] Int. Cl.⁴ .................... G06F 15/00; G11C 19/00
[52] U.S. Cl. .................... 364/900; 328/55; 307/593; 377/76
[58] Field of Search ... 364/200 MS File, 900 MS File; 307/593, 608; 377/48, 50, 52, 72, 76; 328/55

[56] References Cited

U.S. PATENT DOCUMENTS

| | | | |
|---|---|---|---|
| 4,207,985 | 6/1980 | Lockett et al. | 357/407 X |
| 4,241,418 | 12/1980 | Stanley | 364/900 |
| 4,291,241 | 9/1981 | Mayama et al. | 307/269 |
| 4,367,530 | 1/1983 | Morinaga et al. | 364/431.06 |
| 4,443,765 | 4/1984 | Findersin et al. | 377/76 |
| 4,458,308 | 7/1984 | Holtey et al. | 364/200 |
| 4,463,440 | 7/1984 | Nishiura et al. | 364/900 |
| 4,519,028 | 5/1985 | Okin et al. | 364/200 |
| 4,531,022 | 7/1985 | Pioli | 377/72 |
| 4,586,128 | 4/1986 | DeWorkin | 364/200 |
| 4,631,667 | 12/1986 | Zulian et al. | 364/200 |
| 4,692,859 | 8/1987 | Ott | 364/200 |

Primary Examiner—Raulfe B. Zache
Assistant Examiner—Thomas L. Lee
Attorney, Agent, or Firm—Wolf, Greenfield & Sacks

[57] ABSTRACT

A system bus control circuit associated with a central processing unit that generates control signals and in which the control circuit is constructed of a timing circuit having a plurality of successively connected timing stages constructed of data flip-flops for respectively generating sequentially time-displaced timing control signals. A gate array is employed for providing additional logic gating. The control signal from the central processing unit coupled to one group of input lines of the gate array. A second group of input lines to the gate array are coupled from the timing circuit and in particular the individual stages of the timing circuit. The output lines from the gate array generate timing signals that control data bus operation.

15 Claims, 3 Drawing Sheets

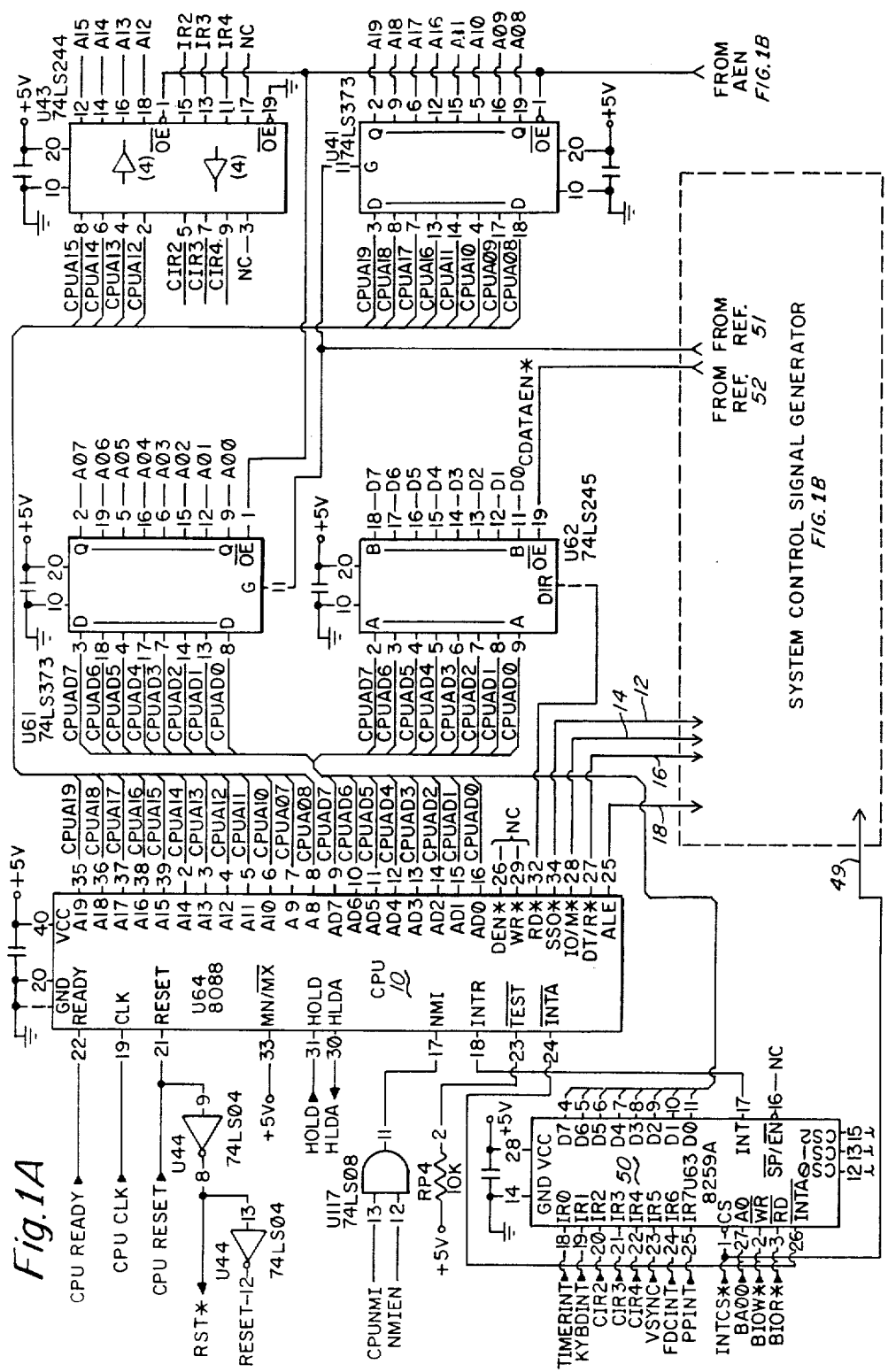

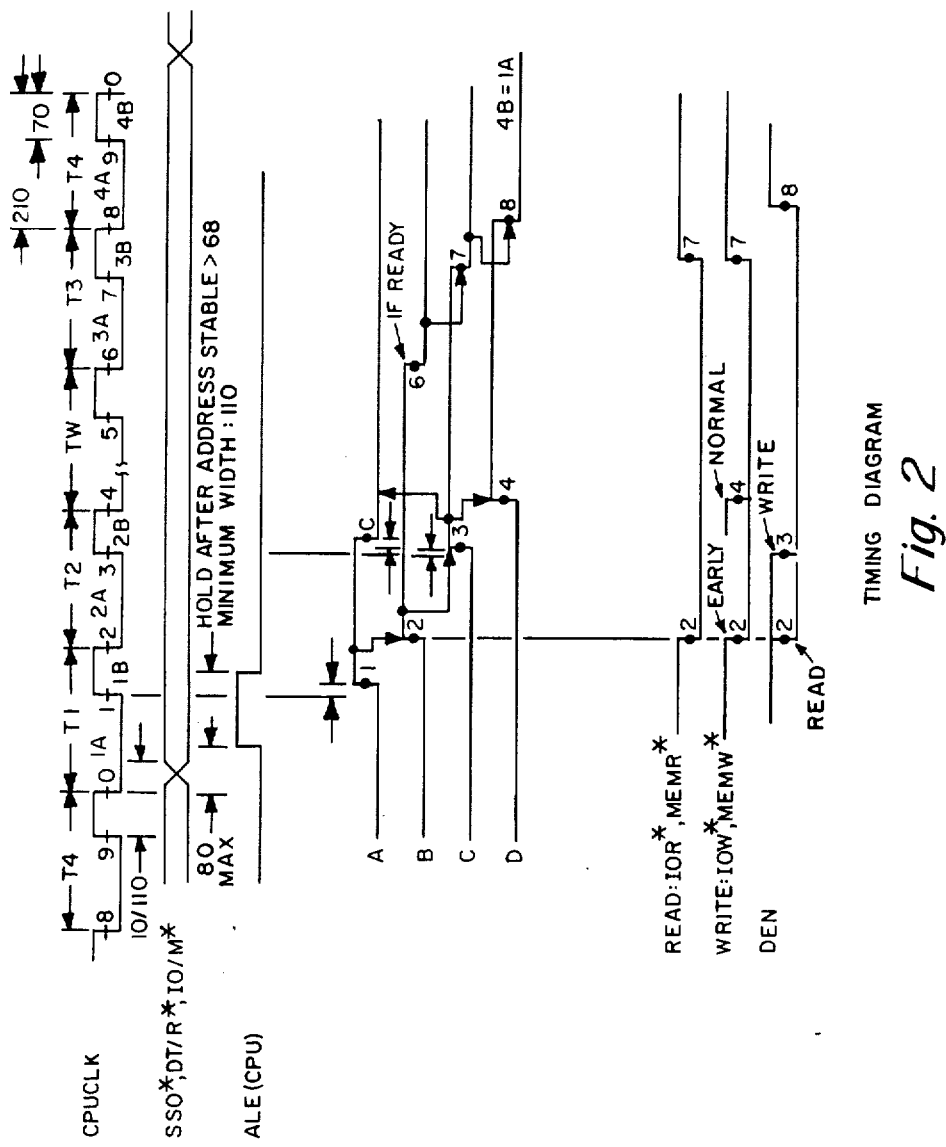

MULTISTAGE TIMING CIRCUIT FOR SYSTEM BUS CONTROL

This application is a continuation of application Ser. No. 666,506, filed Oct. 30, 1984, now abandoned.

BACKGROUND OF THE INVENTION

The present invention relates in general to a system control signal generator. More particularly, the invention relates to a signal generator employed in a computer or data processing system for providing timing signals, particularly, timing signals for controlling the system such as I/O and memory control signals.

In any type of a computer or data processing system, there is a bus controller that is employed for controlling signals transferred on the system bus. For example, one present bus controller that is employed is the Intel Model No. 8288. This device provides for effective bus control, but the problem associated therewith is that the device is relatively expensive and because of its universal design is unduly complex in configuration.

Accordingly, it is an object of the present invention to provide an improved system control signal generator or bus controller that is of improved construction particularly in that it can be fabricated less expensively.

Another object of the present invention is to provide an improved system control signal generator that is relatively simple in construction and that can use readily available inexpensive components without requiring special complex circuit design.

Still another object of the present invention is to provide an improved system control signal generator for use in a computer or data processing system and which requires a relatively small number of components for carrying out multiple controls and in which the signal generator is easy to maintain.

Another object of the present invention is to provide an improved system control signal generator that is of simplified construction, is thus less expensive, and which is readily adaptable to present overall computer system designs.

SUMMARY OF THE INVENTION

To accomplish the foregoing and other objects, features and advantages of the invention, there is provided a system bus controller which is adapted to be coupled from and controlled by a central processing unit that generates control signals such as data status activity signals. These signals have to do with I/O and memory controls and data transmit and receive controls. The bus controller of this invention comprises a timing circuit in the form of a multiple stage timing circuit adapted to generate sequentially time-displaced timing control signals. There is also provided a gate array comprising multiple logic elements and having a plurality of input lines and a plurality of output lines. The control signal or signals from the central processing unit couple to this gate array at a first group of input lines thereto. The other group of input lines to the gate array receive, from the timing circuit stages, the timing control signals which are sequentially time-displaced. The output lines from the gate array generate timing signals that control bus operation. The timing circuit and the multiple stages thereof include a first stage having a constant time interval and a number of additional stages which have variable length time intervals. Each of the timing stages comprise a bi-stable device such as a flip-flop.

The timing stages preferably total four. In accordance with another aspect of the present invention concerned with the variable length time intervals, there is provided a processor ready signal and means for coupling this signal to at least one of the timing stages to control the variable length time interval. There is also provided a signal feedback line coupled from the last stage of the timing circuit back to a previous stage thereof. There is also preferably included a gate means which receives this signal feedback line and also receives the processor ready signal and has an output coupling to the second stage of the timing circuit. The timing circuit is operated from a main clock signal. This main clock signal is coupled to the clock input of each of the flip-flops comprising the timing circuit. The commencement of the overall timing interval involves control from the central processing unit in the form of an address latch enable signal that couples to the first flip-flop to commence the timing sequence.

BRIEF DESCRIPTION OF THE DRAWINGS

Numerous other objects, features and advantages of the invention should now become apparent upon a reading of the following detailed description taken in conjunction with the accompanying drawings, in which:

FIG. 1A is a circuit block diagram of a processing system utilizing the bus controller of the present invention;

FIG. 2 is a timing diagram associated with the circuit block diagram of FIG. 1

DETAILED DESCRIPTION

Figure 1B:
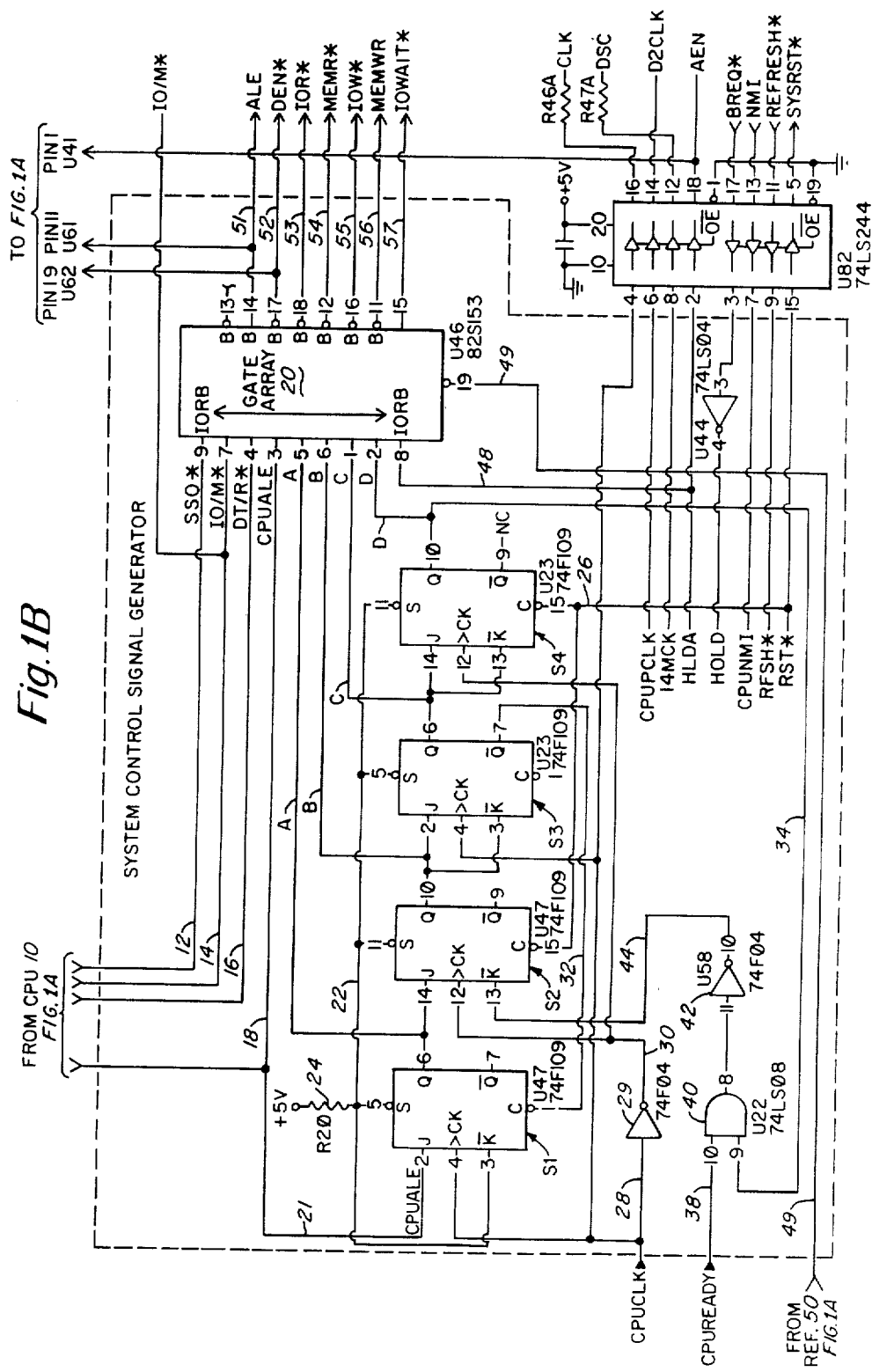
FIG. 1B is a circuit block diagram showing the preferred bus controller of the present invention.

Reference is now made to the circuit block diagram of FIG. 1 which illustrates a preferred embodiment of the controller of the present invention. In association with this diagram, reference is also made to the timing sequence diagram of FIG. 2 which shows the timing sequences as they relate to the circuit block diagram of FIG. 1.

FIG. 1 illustrates the central processing unit (CPU) 10. The CPU may be of type 8088 and is of conventional design. Most of the signals identified in association with the CPU 10 are standard known signals and as such will not be discussed in any detail herein. As far as bus control is concerned, there are four control signals coupled from the central processing unit. These control signals are coupled on lines 12, 14, 16, and 18 from the CPU 10. The signal on line 12 is the signal SSO*. This signal couples to pin 9 of the gate array 20. Pins 1–9 along with pin 19 represent inputs to the gate array 20. The gate array 20 is of type 82S153. The make-up of the gate array 20 will be discussed in further detail hereinafter in association with logic equations used in defining this gate array.

The control line 14 from the CPU 10 is the signal IO/M*. This signal couples to the input pin 7 of the gate array 20. The aforementioned signal SSO* is a status signal coupled from the CPU 10. The signal IO/M* on line 14 indicates either IO or memory control. A third control line 16 coupling from the CPU 10 is the signal DT/R*. This signal couples to the input pin 4 of the gate array 20. This signal is a data transmit/receive signal that controls data as to whether it is being transmitted or received as far as the CPU 10 is concerned. Lastly, there is a signal on line 18 which is the signal ALE. It is noted that this signal couples to the input pin 3 of the gate array 20, but also couples by way of line 21 as the signal CPU ALE to an input of the timing circuit. The signal ALE is an address latch enable signal which indicates that an address has now been latched and processing can commence.

FIG. 1 also shows additional timing inputs to the gate array 20 identified as signals A, B, C, and D. These signals are also identified in timing diagram of FIG. 2. These signals are generated from the timing circuit which is in the form of a pulse delay circuit including stages S1, S2, S3, and S4. Each of these stages is in the form of a flip-flop which is illustrated as being a J-K type flip-flop. These flip-flops may be of type 74F109. The flip-flops are provided in pairs and thus stages S1 and S2 appear on one circuit package and stages S3 and S4 appear on a second circuit package.

By way of example and with reference to stage S1, it is noted that the J-K flip-flop has a clock input at pin 4 and has an assertion output at pin 6 and a negation output at pin 7. The J input is at pin 2 and the K input is at pin 3. The set input is at pin 5 an the clear input is at pin 1. The same nomenclature also applies with regard to stage S3. With regard to stage S2, the clock input is at pin 12 and while the assertion output is at pin 10 and the negation output is at pin 9. The J input is at pin 14 and the K input is at pin 13. The set input is pin 11 and the clear input is pin 15. The same nomenclature equally applies between stages S2 and S4.

It is noted that the set inputs of all of the flip-flops are coupled to a common line 22, and from there by way of resistor 24 to the positive supply voltage. The clear inputs with regard to stages S2-S4 couple to a common line 26 and receive a reset signal identified as signal RST*.

Another signal that is coupled to the array of flip-flops is the main clock signal which is identified as the signal CPU CLK. It is noted that this signal is coupled on line 28 directly to stages S1 and S3 and is also coupled by way of inverter 29 to line 30. Line 30 couples to the clock inputs of both flip-flops associated with stages S2 and S4. Thus, all clocking signals to the flip-flops are derived from the main central processor clock.

As indicated previously, the initial data signal that initiates operation of the timing circuit stages S1-S4 is derived from the CPU 10 and is coupled on line 21 to the J input of the flip-flop at stage S1. The operation of the timing circuit will be discussed in further detail hereinafter as to the wave forms that are generated and in particular the signals A, B, C, and D. For now, the connections will be identified with regard to this timing circuit. Thus, at the output of the first stage, which is pin 6 of the flip-flop, this signal couples to line A (and associated signal A). The output from stage S1 also couples to the J input of the next stage S2. Thus, the setting of the second stage is interrelated to the transition of the waveform at the output of the first stage as will be discussed in further detail hereinafter.

The output from the second stage S2 at pin 10, which is the assertion output, couples to both data inputs of the next stage which are the J and K inputs to the stage S3. This output at pin 10 of stage S2 also couples on line B and is the aforementioned signal B.

The output from the third stage S3 at pin 6, which is the assertion output, couples in common to both the J and K inputs of stage S4 and also couples to line C giving the signal C as mentioned before. There is also a negation output at pin 7 from stage S3 which couples back to the clear input of stage S1 by way of line 32.

Finally, the output from stage S4 at the assertion output of the flip-flop is the signal D and also couples by way of line 34 in a feedback loop to one input of the AND gate 40. The AND gate 40 also has a signal on line 38 which is a wait control signal referred to herein as the CPU signal (CPU READY). The output of the gate 40 couples to inverter 42. The output of the inverter 42 couples to line 44 which connects directly to the K input of the second stage S2 flip-flop. Thus, the feedback from the output stage actually couples back to the second stage of the overall timing circuit and provides for variable timing sequences as to be defined hereinafter in connection with the timing diagram of FIG. 2.

There are two other input signals to the gate array 20. One of these signals is on line 48 which is the signal HLDA. This is a hold acknowledge signal. Lastly, there is an input signal on line 49 which is the signal INTCS*. It is noted that this signal also couples to the interrupt controller 50. The signal INTCS is an interrupt chip select signal. This signal INTCS* thus controls the interrelationship of operation between the interrupt controller 50 and the gate array 20. When the processor is communicating with the interrupt controller 50, the input signal on line 49 is interrupted to the gate array 20.

At the output of the gate array 20 there are shown multiple output lines including lines 51-57. These output signals control certain bus operations in the computer system. The signal on line 51 is the signal ALE which is an address latch enable signal. The signal on line 52 is the signal DEN*. This signal is a data enable signal and in a sense is considered to be opposite to the ALE signal. The signal on line 53 is the signal IOR*. This is the I/O read signal. The signal on line 54 is the signal MEMR*. This is the memory read signal. The signal on line 55 is the IOW* signal. This is the I/O write signal. The signal on line 56 is the signal M.EMWR. This is the memory write signal. The signal on line 57 is the signal IOWAIT*. This is the I/O wait signal. These signals are used in the computer system in a known manner and thus their connections to other parts of the system are not shown in detail herein. These in essence are the same output signals as generated by the Intel 8288 bus controller referred to hereinbefore.

With regard to the gate array 20, this comprises a circuit that is comprised of multiple logic elements that are configured under computer control to provide desired outputs from selected inputs on the basis of logic equations that are used under computer control to modify the gate structure so as to carry out the logic equations. In this connection hereinbelow is now set forth the set of logic equations that relate the input and output signals. To the left is the set of output signals and to the right in each equation are the corresponding input signals that are used to derive these outputs.

SYSTEM TIMING $$ALE = \overline{HLDA} \cdot CPU\ CALE$$

$$DEN^* = \overline{HLDA} \cdot \overline{IO/M} \cdot \overline{DT/R} \cdot C\ INTCS^* \cdot SS\phi\ (IOR) +$$

$$\overline{HLDA} \cdot \overline{IO/M} \cdot \overline{DT/R} \cdot C \cdot INTCS^*\ (MEMR) +$$

$$\overline{HLDA} \cdot B \cdot \overline{DT/R} \cdot INTCS^* \cdot \overline{SS\phi} +$$

-continued
SYSTEM TIMING $$\overline{HLDA} \cdot DT/\overline{R} \cdot C \cdot INTCS^* \cdot \overline{SS\phi}(MEMW)$$

$$IOR^* = \overline{HLDA} \cdot IO/\overline{M} \cdot B \cdot \overline{DT/\overline{R}} \cdot SSO^*$$

$$MEMR^* = \overline{HLDA} \cdot \overline{IO/\overline{M}} \cdot B \cdot \overline{DT/\overline{R}}$$

$$IOW^* = \overline{HLDA} \cdot IO/\overline{M} \cdot B \cdot DT/\overline{R} \cdot \overline{SS\phi}$$

$$MEMW^* = \overline{HLDA} \cdot \overline{IO/\overline{M}} \cdot B \cdot DT/\overline{R} \cdot \overline{SS\phi}$$

$$IOWAIT = \overline{HLDA} \cdot IO/\overline{M} \cdot A \cdot \overline{DT/\overline{R}} \cdot SS\phi +$$

$$\overline{HLDA} \cdot IO/\overline{M} \cdot A \cdot DT/\overline{R}$$

Reference is now made to the timing diagram of FIG. 2. This diagram shows the signal CPU CLK at the top thereof. The basic timing clock signal as is noted, is separated into time slots T1, T2, TW (wait), T3, and T4. The cycle then repeats. The timing diagram also shows the CPU control signals SSO*, DT/R*, and IO/M*. The timing diagram also illustrates the signal ALE CPU which becomes active during the time interval T1.

The timing diagram of FIG. 2 also illustrates the signals A, B, C, and D which are generated from the timing circuitry at stages S1–S4, respectively. Finally, at the bottom of the timing diagram of FIG. 2 are shown output bus control signals. One of these signals is a read signal corresponding to the signals IOR* and MEM*. The second waveform is a wright signal corresponding to the signals IOW* and MEMWR*. The last waveform is the signal DEN which is the data enable signal.

As indicated previously, the system control signal generator of this invention provides the timing strobe signals that are required by the system. These are illustrated as the final output lines 51–57 in FIG. 1. These include the signals IOW*, IOR*, MEMWR*, MEMR*, ALE, DEN*, and IO/M*. But these signals are synthesized by the gate array 20 from the timing circuit signals A, B, C, and D, along with the CPU 10 (8088 device) status signals SSO*, DT/R*, and IO/M*. In addition, as indicated previously, the gate array is controlled by signals HLDA and INTCS*. As also indicated previously, the timing signals A, B, C, and D come from respective stages S1 and S4. Each of these stages comprises a flip-flop as noted. The timing clock supplied to the flip-flops is the signal CPU CLK.

A CPU cycle is divided basically into five periods, T1, T2, TWAIT, T3, and T4. Each cycle has a clock rising edge and a clock falling edge. In this regard, note the diagram of FIG. 2 and where the rising and falling edges occur. Hereinafter, the designation of, for example, T1+ denotes a rising edge and the signal T1− denotes a falling edge. The signal A is started from the signal CPU ALE being true and from T1+. The signal A is terminated by the signal C and the signal T2+.

The signal B is initiated from the signal A and the transition T1−. This signal B is terminated under control of the signal CPU READY, which is the central processing ready signal along with the signal D and the timing signals TW−/TW3−.

The timing signal C is initiated from the previous stage of the signal B along with the timing signal T2+. The signal C is terminated by the signal "BNOT" along with a timing signal T3+.

The signal D is initiated from the signal C during the timing interval T2−. The signal D is terminated by the signal "CNOT" during the timing transmission T3−.

It is noted from the timing diagram of FIG. 2 that the interval of the signal A is substantially constant while the interval of the signals B, C, and D is a function of a waiting period. Characteristically, the signal A is always one clock length while the signals B, C, and D are variable in length depending upon the number of inserted "wait" states. These wait states are determined by the signal CPU READY on line 38. As indicated previously, there is a feedback from the signal D and the last stage S4 of the timing circuit to the gate 40 and this feedback continues on by way of inverter 42 and line 44 to the input of the second stage S2 of the timing circuit. With this arrangement, any half-clock period between transitions T1+ and T3− can be logically combined to create the output timing signals as illustrated in FIG. 2.

It is noted from the timing diagram and also from the equations relating to the gate array 20, that the signal DEN* on line 52 is substantially identical to the enable signal from the CPU 20 except when the interrupt controller 50 is addressed. At that time it remains inactive now because the interrupt controller and the CPU are on the same data bus. The bus signal ALE is buffered by the signal HLDA which is the hold acknowledge signal as indicated from the equations.

Reference has been made previously to the variable length of the signals B, C, and D, which length is dependent upon the number of inserted "wait" states. Again, this relates to the timing of the signal CPU READY. Depending upon when this signal becomes active, the length of the signals B, C, and D may be shorter or longer. Thus, there has been provided herein, a relatively simple technique for providing variable width timing signals under control of the preferred signal CPU READY without having to get involved in complex timing circuitry.

Having now described a limited number of embodiments of the present invention, it should now be apparent to those skilled in the art that numerous other embodiments are contemplated as falling within the scope of the present invention as defined by the appended claims.

What is claimed is:

1. A system bus controller for coupling from and control by a central processing circuit generating at least one control signal, said controller comprising;
   a timing circuit responsive to a processor ready signal coupled from said central processing circuit and having a plurality of successively connected timing stages for respectively generating variable time length interval sequentially time-displaced timing control signals;
   a gate array comprising multiple connected logic elements and having a plurality of input lines and a plurality of output lines;
   means coupling said at least one control signal from the central processing circuit to one of said plurality of input of lines of the gate array;
   means coupling from said timing circuit including multiple lines coupling from respective timing stages to couple said timing control signals to different ones of said plurality of input lines of the gate array, said gate array generating timing signals that control data bus operation based upon the signals on said plurality of input lines;

said output lines outputting said gate array generated timing signals that control data bus operation; and means for coupling said processor ready signal to at least one of the timing stages to control the time length interval of the variable time length interval sequentially time-displaced timing control signals.

2. A system bus controller as set forth in claim 1 wherein said timing stages include a first stage having a fixed time interval and at least a second stage having a variable length time interval.

3. A system bus controller as set forth in claim 2 wherein each timing stage comprises a bi-stable device.

4. A system bus controller as set forth in claim 3 wherein the timing stages number four.

5. A system bus controller as set forth in claim 2 wherein said processor ready signal is coupled to at least said second stage for controlling said variable length time interval.

6. A system bus controller as set forth in claim 1 wherein said timing stages include a first stage having a constant time interval and at least second and last stages having variable length time intervals.

7. A system bus controller as set forth in claim 6 including a signal feedback line coupled from the last stage of the timing circuit back to a previous stage thereof.

8. A system bus controller as set forth in claim 7 including a gate means receiving said signal feedback line and said processor ready signal and including an output coupling to the second stage of the timing circuit.

9. A system bus controller as set forth in claim 8 wherein there are four timing stages in total each comprising a flip-flop.

10. A system bus controller as set forth in claim 9 including main clock signal and means coupling the main clock signal to the clock input of each flip-flop.

11. A system bus controller as set forth in claim 10 wherein each flip-flop is a J-K type flip-flop.

12. A system bus controller as et forth in claim 11 wherein one of the control signals from the central processing circuit is an address latch enable signal that couples to the first flip-flop to commence the timing sequence.

13. A system bus controller as set forth in claim 12, wherein the output of the second flip-flop couples to both J and K inputs of the third flip-flop.

14. A system bus controller as set forth in claim 13 wherein the output of the third flip-flop couples to both J and K inputs of the fourth flip-flop.

15. A system bus controller as set forth in claim 1 wherein said means coupling said at least one control signal includes multiple control lines for data status activity.

* * * * *